(12) United States Patent
Sutherland et al.

(10) Patent No.: US 11,314,472 B2
(45) Date of Patent: Apr. 26, 2022

(54) MODIFIED TRACKING MEASURES

(71) Applicant: HEWLETT-PACKARD DEVELOPMENT COMPANY, L.P., Spring, TX (US)

(72) Inventors: Jesse Sutherland, Vancouver, WA (US); Wesley R Schalk, Vancouver, WA (US); Kris M English, Vancouver, WA (US); Steven Dworzak, Pointe-Claire (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/500,387

(22) PCT Filed: May 14, 2018

(86) PCT No.: PCT/US2018/032581
§ 371 (c)(1),
(2) Date: Oct. 2, 2019

(87) PCT Pub. No.: WO2019/221697
PCT Pub. Date: Nov. 21, 2019

(65) Prior Publication Data
US 2021/0326088 A1 Oct. 21, 2021

(51) Int. Cl.
*G06F 3/12* (2006.01)
*G06Q 10/00* (2012.01)

(52) U.S. Cl.
CPC .......... *G06F 3/1273* (2013.01); *G06F 3/1204* (2013.01); *G06F 3/1285* (2013.01); *G06Q 10/20* (2013.01)

(58) Field of Classification Search
CPC combination set(s) only.
See application file for complete search history.

(56) References Cited

U.S. PATENT DOCUMENTS

| | | | |
|---|---|---|---|
| 5,146,344 A | 9/1992 | Bennett | |
| 5,349,377 A | 9/1994 | Gilliland | |
| 6,741,262 B1 | 5/2004 | Munson et al. | |
| 7,734,209 B2 | 6/2010 | Pathak et al. | |
| 7,856,400 B2 | 12/2010 | Knodt | |
| 8,666,155 B2* | 3/2014 | Campbell | G06K 9/00442 382/162 |
| 9,830,560 B2 | 11/2017 | Oka | |
| 2003/0014446 A1 | 1/2003 | Simpson et al. | |
| 2003/0123077 A1* | 7/2003 | Siegel | G03G 15/553 358/1.14 |
| 2009/0190948 A1* | 7/2009 | Pathak | G03G 21/02 399/79 |
| 2010/0328050 A1 | 12/2010 | Kothari et al. | |
| 2012/0194850 A1 | 8/2012 | Srinivasmurthy et al. | |

(Continued)

*Primary Examiner* — Helen Zong
(74) *Attorney, Agent, or Firm* — HP Inc. Patent Department (57) ABSTRACT

Example tracking measures for a first functionality category may be used to generate a modified tracking measure if it is determined that the first functionality category is unsupported by an automated functionality tracking component. The modified tracking measure may be transmitted for categorization in a second functionality category, wherein the second functionality category is different from the first functionality category.

13 Claims, 3 Drawing Sheets

(56) References Cited

U.S. PATENT DOCUMENTS

| | | | |
|---|---|---|---|
| 2015/0205546 A1* | 7/2015 | Darragh | G06Q 30/06 |
| | | | 358/1.15 |
| 2017/0295295 A1 | 10/2017 | Imai | |
| 2018/0338050 A1* | 11/2018 | Kuwasaki | G06F 3/1273 |
| 2019/0260879 A1* | 8/2019 | Raleigh | H04W 4/24 |
| 2019/0286387 A1* | 9/2019 | Wong | G06F 3/1275 |
| 2020/0326896 A1* | 10/2020 | Shramm | G06F 11/3442 |

* cited by examiner

MODIFIED TRACKING MEASURES

BACKGROUND

Service providers may offer, among other things, devices and software applications to customers. Service providers may track use of functionalities of devices and software applications. Some categories of functionality of the offered devices and software applications may not be supported by the service provider.

BRIEF DESCRIPTION OF THE DRAWINGS

Various examples will be described below by referring to the following figures.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

The present description refers to service providers, which provide software and/or hardware to customers, often bundled with service (e.g., maintenance, repair, etc.), in exchange for payment, such as payment at regular intervals (e.g., monthly). In one example, a service provider may furnish a customer (e.g., a law firm) with computers, software, printers, and/or IT hardware and service (e.g., routers, switches, servers, etc.) as part of an agreement between the customer and the service provider. In one example agreement, rather than purchasing hardware, the customer may make regular payments corresponding to an agreed-upon number of hardware devices and level of service (e.g., $500 per month for five computers with Microsoft Office, an A3 format printer/copier with 30 k printed pages covered in the monthly price, etc.), such as part of a lease agreement. In another example, the customer may purchase the equipment and services at the outset-perhaps at a discount-rather than leasing it, and the agreement between the service provider and the customer may be for monthly payment in exchange for maintenance, repair, and upkeep.

Continuing this example, the customer may desire to use a functionality, such as a particular functionality of a device, used herein to refer to an operation or function performed in whole or part by the device, such as in response to a user instruction. Thus, for example, a functionality of a print device may include formation of markings on print media according to a print mode (e.g., a black and white print mode, a duplex print mode, etc.) and/or media handling and finishing (e.g., stapling, binding, etc.). In the context of a Voice-over-Internet Protocol (VoIP) phone device, a functionality may include a conference calling feature (e.g., three-way calling, a ten-person conference call, etc.) or other feature (e.g., visual voicemail, etc.). Returning to the example of a print device, the customer may desire to print a certain number of pages per month of varying print modes, and the service provider may provide devices (e.g., print devices), media (e.g., paper), and a print substance (e.g., an ink and/or a toner), along with service and repair, as needed (e.g., to replace a developer unit in a laser print device). In some cases, the terms of the agreement between the service provider and the customer may take usage, such as of a particular functionality, into account. For instance, the monthly price may be higher for higher usage, and lower for lower usage, etc. Additionally, there may be tiered pricing models in which usage above or below certain thresholds may have a lower or higher per unit price (e.g., $0.05 per page for 10 k pages per month, $0.045 per page for 15 k pages per month, etc.). There may be a desire, therefore, to track usage of functionality (such as device functionality). Additionally, usage metrics may provide service providers (and device manufacturers) with data that may be useful for business reasons (e.g., identifying devices that are prone to breaking, etc.). It is noted that at times the present description refers to functionality usage merely as "usage," for simplicity.

As should be appreciated, tracking usage of functionality may be relatively simple when usage amounts can be tracked with a notepad, a pen, and a calculator. However, and continuing with the example of a print device by way of non-limiting example, as functionality usage increases into the thousands and millions of pages per unit time (e.g., month), there may an interest by service providers in automating tracking and billing systems, such as for efficiency. It is noted, that the present description refers to service provider tracking and billing systems in combination (such as "tracking" systems, "billing" systems, or "tracking and billing" systems, interchangeably). For, at times, tracking and billing may be part of a comprehensive package. However, this is done merely for simplicity and does not limit claimed subject matter to such combined and/or separate systems. Indeed, any number of systems and arrangements (e.g., separate tracking and billing systems, and the like) are contemplated by claimed subject matter. Returning to the description of usage tracking, as functionalities (e.g., black and white versus color printing, duplex versus simplex printing, professional print mode versus draft print mode, etc. in the case of print devices) and pricing tiers increase in number, tracking and billing may become more complex.

To handle such complexity, automated systems for tracking functionality usage may be used. While automated functionality tracking systems may be adept at tracking high usage volumes with efficiency, they may be poorly adapted to handle unexpected measures of usage, referred to herein as "tracking measures," and/or categories of functionality. For example, if new devices are distributed by a service provider with an updated functionality (e.g., an improved print mode) and the automated tracking and billing system of the service provider does not have the ability to track measures of the updated functionality, the updated functionality may not be accessible to customers—even if there is an interest—until the automated tracking and billing system can be updated to receive information relating to the updated functionality, such as tracking measures. Said otherwise, the automated tracking and billing system of the service provider may not have the ability to track functions for a category to which the new functionality may correspond. If the automated tracking system of a service provider is not able to track usage of a functionality and/or a category of functionality, the present disclosure refers to that category or tracking measure as "unsupported" by the service provider and/or the automated tracking system.

The example of a service provider offering printing as a service to customers is used to illustrate potential effects of a lack of support of functionality by a service provider. For instance, print devices may be provided to customers of the service provider from a print device manufacturer. In response to user demand, the print devices may have been designed to offer a functionality (e.g., printing with metallic inks, printing with an improved draft mode, etc.). However, for the service provider, which may have hundreds of millions of print devices (potentially from dozens of different manufacturers) placed among thousands of different customers, there may not be interest in updating the automated tracking and billing system to support the new functionality. And even if there is interest in updating the automated tracking and billing system to provide the ability to track and bill for use of the functionality, the process may be time-consuming and expensive. For these reasons as well as others, access to the new functionality by customers may be delayed.

TABLE 1

| Functionalities | Device 1 | Device 2 | Device N | Service provider support? |
|---|---|---|---|---|
| Functionality 1 | Y | Y | Y | Y |
| Functionality 2 |   | Y | Y | Y |
| Functionality 3 |   |   | Y | N |
| Functionality X |   |   | Y | N |

Table 1, above, illustrates an example case in which a single service provider offers N different device types (e.g., twenty different print device models). The different print devices may offer differing combinations of X different functionalities (e.g., black and white print mode versus color print mode, duplex print mode versus simplex print mode, draft print mode versus general print mode versus professional print mode, etc.) As shown, the service provider may not support, or offer all available functionality to its customers. For example, if functionality 1 and functionality 2 refer to black and white print mode and professional print mode, respectively, while functionality 3 refers to a draft print mode (e.g., a less expensive color print mode) and functionality X refers to a print mode using metallic inks, there may be a disconnect between functions offered by the service provider and functions desired by customers. As such, the customer may be unsatisfied with the service received from the service provider. Additionally, the device manufacturer may be unsatisfied that more of its devices with unsupported functionality are not being purchased (e.g., because the functionality is not supported by the service provider). And the service provider may be unhappy in response to the dissatisfaction of the customers.

With the foregoing in mind, there may be an interest in methods, devices, and/or systems for enabling use of functionality (e.g., on devices), such as before support is provided for the functionality by service providers (e.g., by an automated functionality tracking system of the service provider). In one example, such functionality may be enabled (even absent support by the service provider) via an intermediary component, referred to herein as an interface. The interface may receive tracking measures and functionality categories from devices and/or software, such as print devices. The interface may be capable of providing modified tracking measures to correspond to functionality categories that are supported by an automated functionality tracking component of a service provider, thereby enabling use of unsupported functionalities.

Figure 1:
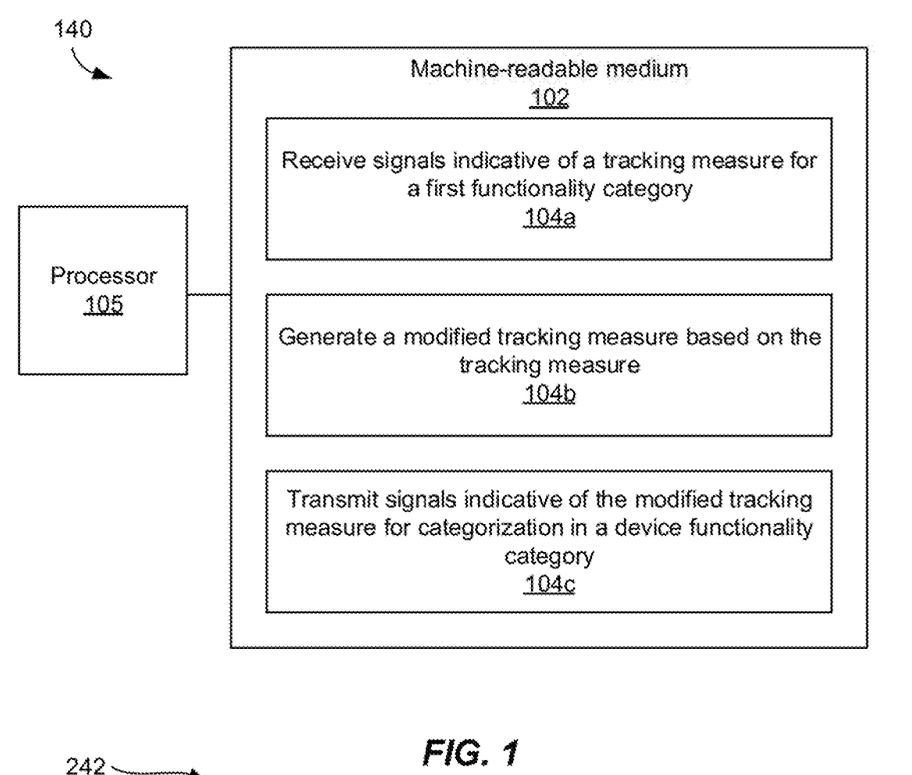
FIG. 1 is an illustration of an example interface for generating modified tracking measures.

One such interface 140 is illustrated in FIG. 1 as a combination of hardware, software, and/or firmware. Machine-readable medium 102 refers to a component capable of storing signals or states to enable operation of an interface (among other things), and is non-transitory in form. Examples of machine-readable medium 102 include volatile and non-volatile memory, such as random-access memory (RAM), read-only memory (ROM), flash memory, resistive memory, magnetic memory, etc. Processor-executed instructions, such as illustrated by 104a-104c may be stored in machine-readable medium 102. Processor 105 refers to a combination of hardware (e.g., circuitry), firmware, and/or software to enable execution of instructions, such as from machine-readable medium 102, to, for example, perform arithmetic, execute logic, control operation of a device or system, and manage input/output operations.

Thus, using machine-readable medium 102 and processor 105, an interface may be provided, such as to enable customer access to functions of a device or software application that is unsupported by an automated tracking and billing system of a service provider. In one example case, therefore, instructions enabling reception of signals indicative of a tracking measure for a first functionality category may be fetched from machine-readable medium 102 and executed by processor 105 (block 104a). For example, the tracking measure may include a number of pages printed (e.g., a page count) and the first functionality category may include a depletion color print mode.

Instructions to generate a modified tracking measure based on the tracking measure may be fetched. Processor 105 may execute the instructions represented by block 104b in order to generate a modified tracking measure that is based on the tracking measure received at block 104a. For example, if the tracking measure received responsive to execution of instructions corresponding to block 104a included 1 k pages printed in the example depletion color print mode, upon execution of the instructions in block 104b by processor 105, the measure may be scaled or weighted to correspond to a different functionality category. By way of illustration, the 1 k depletion color print mode pages could be converted to 1 k black and white print mode pages, converted to 0.33*1 k color print mode pages, or could be converted to 1.2*1 k black and white print mode pages (assuming support for black and white and color print modes), by way of non-limiting example. As such, generation of the modified tracking measure may be referred to as a transformation of the initial tracking measure, such as through application of a scaling factor. Further, the resultant tracking measure may enable categorization in a supported functionality category.

Processor 105 may fetch and execute additional instructions, such as those represented at block 104c, to enable transmission of signals indicative of the modified tracking measure generated responsive to execution of instructions corresponding to block 104b for categorization in a second functionality category. Continuing with the previous example, if the modified tracking measure for 1 k depletion color print mode pages is 1 k black and white print mode pages, then signals indicative of 1 k black and white print mode pages may be transmitted, such as to an automated tracking and billing component of a service provider in response to execution of instructions corresponding to block 104c. Reception and transmission of signals may be enabled using an input/output (I/O) component, such as a transceiver.

Thus, tracking measures of a device or program, which correspond to a first functionality category (e.g., a particular print mode, a particular software functionality, etc.) may be modified to correspond to a modified tracking measure for a second functionality category, which is supported by the automated functionality tracking component.

Figure 2:
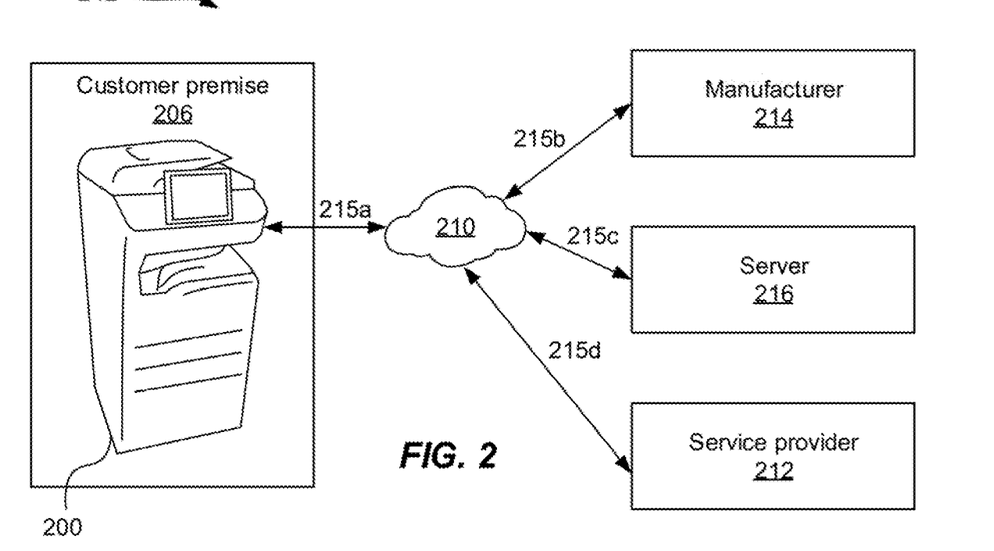
FIG. 2 is an illustration of an example system for which modified tracking measures may be provided.

FIG. 2 provides an example system 242 that may be used to modify tracking measures to correspond to a functionality category that is supported by an automated functionality tracking component. While the example interface 140 of FIG. 1 may be used in a number of different contexts, such as devices and software applications provided by service providers, FIG. 2 presents an example system 242 in which such an interface may be used for print devices. This is done without limitation as interface 140 of FIG. 1 may be used in a number of systems other than example system 242 of FIG. 2. In the example system 242 of FIG. 2, a service provider 212 is in communication (e.g., capable of exchanging signal packets containing data) with print devices, such as print device 200, in operation on customer premises, such as customer premise 206, via communications channels 215a and 215d and network 210. A network, such as network 210, may comprise two or more devices, such as network devices and/or computing devices, and/or may couple devices, such as network devices and/or computing devices, so that signal communications, such as in the form of signal packets and/or signal frames (e.g., comprising signal samples), for example, may be exchanged, such as between a server device, a client device and/or a peer-to-peer device, as well as other types of devices, including between wired and/or wireless devices coupled via a wired and/or wireless network, for example. Network 210 may comprise a private and/or a public network, without limitation. The signal packets and/or signal frames exchanged may be in the form of binary electric signals in one implementation, but could also be in the form of analog electric signals, optical signals, and other forms used presently or in the future. Communication channels 215a-215d represent wired and/or wireless connections via which signals may propagate (and may include intermediate devices, without limitation).

Additionally, print device 200 may be in communication with its manufacturer 214 via communications channels 215a and 215b and network 210. Other remote or on-premise devices may be in communication with print device 200, such as illustrated by server 216, which is is in communication with print device via communications channels 215a and 215c and network 210. In an implementation in which server 216 resides on customer premise 206, the connection between print device 200 and server 216 may comprise a local area network (LAN) connection and/or intranet connection, such that communication channels 215a and 215c and network 210 comprise LAN and/or intranet connections. Further, the connections between print device 200 and manufacturer 214 and/or print device 200 and service provider 212 may also comprise LAN and/or intranet connections in some example implementations.

A connection between print device 200 and manufacturer 214 may be of interest, for example, such as to facilitate transmission of firmware updates to devices, such as print device 200. Additionally, there may be an interest in receiving indications of device status, indications of device usage (e.g., tracking measures), indications of device downtime/uptime, indications of supply and consumable status (e.g., confirming that authorized supplies and/or consumable components are being used, such as consistent with an agreement between manufacturer 214 and service provider 212), and the like.

A particular customer may have multiple premises, including multiple offices, in which print devices, such as print device 200, may be installed. Installed print devices could include a number of different models with differing functionality and/or from differing manufacturers. By way of non-limiting example, a customer that is a university may have multiple campuses and multiple buildings spread across the different campuses. Devices installed throughout the customer premises may include, but not be limited to, ink, laser, large format, graphics devices, and the like. Page impression on the different devices may vary in cost and a certain number of printed pages may be included in a service agreement between the customer and service provider 212. Thus, service provider 212 may use an automated functionality tracking component to track device usage across different devices and different premises.

Server 216 could be a server controlled by a third party, associated with manufacturer 214, service provider 212, or the customer. In one implementation, an interface may run on server 216 and may enable generation of modified tracking measures in order to offer access to functionality that is unsupported by service provider 212. However, in other implementations, the combination of hardware, software, and firmware to enable generation of modified tracking measures may run on a different device, such as print device 200, a server of manufacturer 214, a device residing at customer premise 206, etc.

In the following paragraphs, operation of the devices and components illustrated in FIG. 2 according to one example implementation are described, referring back to components of FIG. 1. In this example, processor 105 and machine-readable medium 102 of FIG. 1 may be found on print device 200, another device on customer premise 206, a device of manufacturer 214, server 216, or a device of service provider 212, without limitation.

TABLE 2

| Print device 200 Functionalities | Tracking measure | Service provider support? | Modified tracking measure | New functionality category |
|---|---|---|---|---|
| Functionality category 1 | 10k | Y | NA | NA |
| Functionality category 2 | 1.5k | Y | NA | NA |
| Functionality category 3 | 500 | N | 1.3 * 500 | Cat 1 |
| Functionality category 4 | 5k | N | 5k | Cat 1 |

Table 2 represents example page impressions corresponding to use of print device 200 during a unit of time (e.g., a month). For this example, functionality category 1 corresponds to a black and white print mode, functionality category 2 corresponds to a color print mode, functionality category 3 corresponds to an accent color print mode (e.g., a print mode comprising primarily black and white or greyscale, but with some color accents), and functionality category 4 corresponds to a depletion color print mode (e.g., a print mode comprising reduced amounts of color print fluid).

The tracking measures illustrated in Table 2 may be evaluated consistent with the components illustrated in FIG. 1. For example, processor 105 may, responsive to execution of instructions represented by block 104a, receive signals indicative of tracking measures for functionality categories (e.g., functionality categories 1-4 in Table 2). Processor 105 may, for example, determine whether the received tracking measures are supported by an automated functionality tracking component. Thus, for example, processor 105 may determine whether the automated functionality tracking component of service provider 212 supports a black and white print mode (e.g., functionality category 1), a color print mode (e.g., functionality category 2), an accent color print mode (e.g., functionality category 3), and a depletion color print mode (e.g., functionality category 4). As illustrated in Table 2, it may be determined that service provider 212 supports black and white and color print modes (functionality categories 1 and 2), but does not support the accent color print mode or the depletion color print mode (functionality categories 3 and 4). Thus, responsive to execution of instructions represented by block 104b, processor 105 may generate modified tracking measures based on the tracking measures for the accent color print mode and the depletion color print mode.

As illustrated by Table 2, in this example, the generated modified tracking measure for the accent color print mode (functionality category 3) may correspond to a weighted version of the original tracking measure for the functionality category 3, or 1.3*500. And the generated modified tracking measure for the depletion color print mode may correspond to an unweighted version of the original tracking measure for the functionality category 4, or 5 k.

Processor 105 may execute instructions, such as the instructions illustrated by block 104c, and transmit signals indicative of the modified tracking measures for categorization in functionality categories different than the original functionality categories. For example, for the accent color print mode, the transmitted signals for the modified tracking measure may be for categorization in functionality category 1. Similarly, for the depletion color print mode, the transmitted signals for the modified tracking measure may be for categorization in a category other than category 4, in the case of this example, functionality category 1.

The transmitted signals may be sent to service provider 212 and may allow customers to use functionalities that are not supported, and allow service provider 212 to track and bill for use thereof. While the foregoing example uses an implementation involving a print device, other devices and software applications may have functionality that may be enabled (e.g., even if unsupported by a service provider) using an interface such as described in relation to FIGS. 1 and 2.

Figure 3:
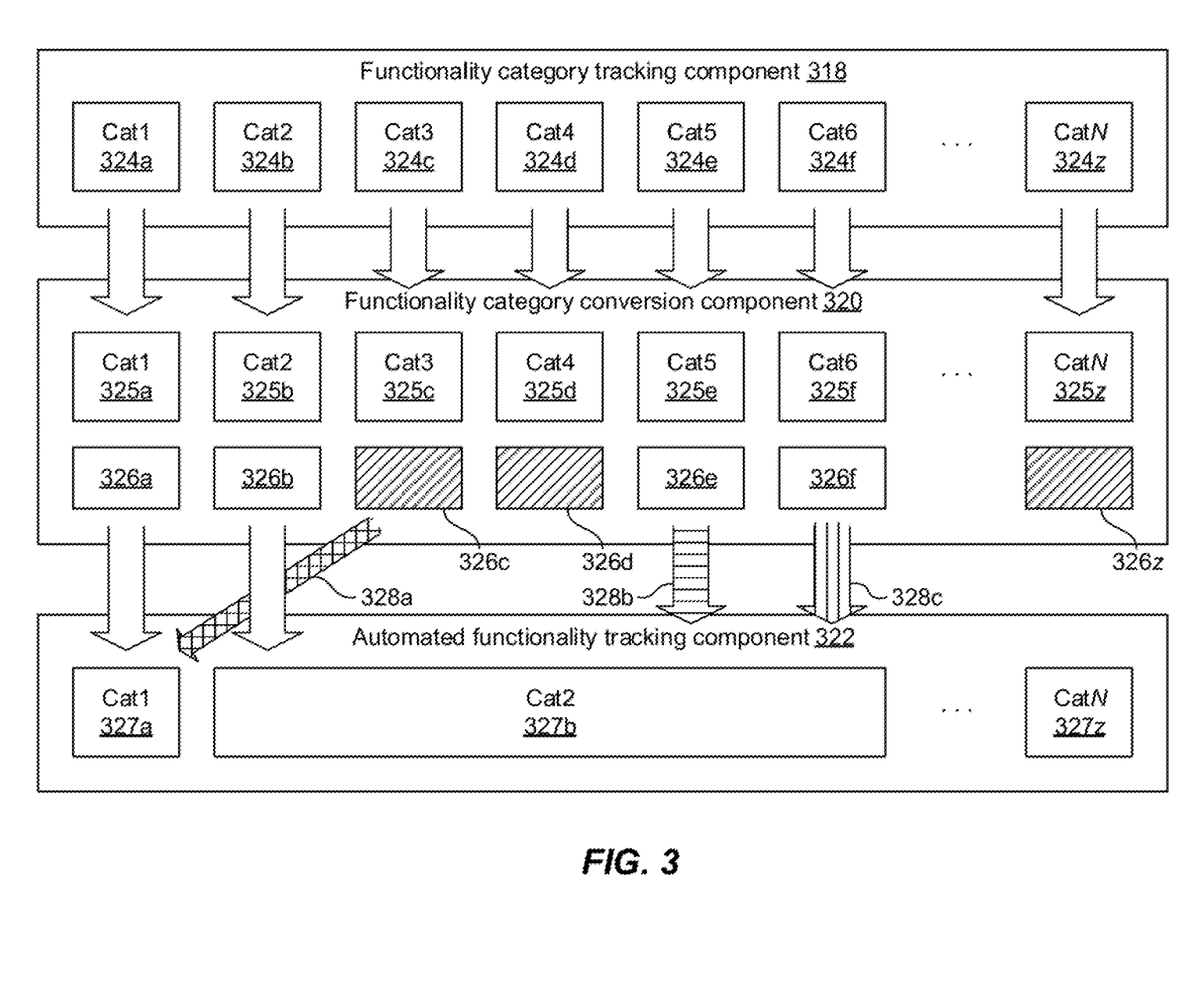
FIG. 3 is a block diagram of an example system in which modified tracking measures may be used.

Moving on to FIG. 3, operation of an example interface to provide modified tracking measures that may be categorized within supported functionality categories is described. In the example illustrated in FIG. 3, the interface is described in terms of a functionality category conversion component 320, while functionality category tracking component 318 corresponds to a combination of hardware, software, and/or firmware to track usage (e.g., on a print device), and automated functionality tracking component 322 corresponds to a tracking and billing system of a service provider. Functionality category tracking component 318, functionality category conversion component 320, and automated functionality tracking component 322 are illustrated as block diagrams for simplicity. Functionality category tracking component 318, functionality category conversion component 320, and automated functionality tracking component 322 represent a combination of hardware, software, and/or firmware, such as processor-executed instructions. For instance, a processor, such as processor 105 of FIG. 1, may fetch and execution instructions from a machine-readable medium, such as machine-readable medium 102 of FIG. 1, to enable operation of functionality category tracking component 318, functionality category conversion component 320, and automated functionality tracking component 322. It is to be understood that though functionality category tracking component 318, functionality category conversion component 320, and automated functionality tracking component 322 are described in conjunction with particular devices, such as those described in relation to FIG. 2, other implementations are contemplated by claimed subject matter. For example, the components may operate as part of a distributed computing network in which at least a portion of the described processes is allocated among different devices, including client devices, server devices, and/or peer-to-peer devices, via a network.

Thus, returning to the example of FIG. 2, functionality category tracking component 318 may operate in response to execution of instructions on print devices, such as print device 200. Functionality category tracking component 318 may be able to track functionality usage (e.g., tracking measures), such as across functionality categories 324a-324z, illustrated as Cat1-CatN. The arrows leading from functionality categories 324a-324z represent tracking measures (e.g., in the form of signals) that are transmitted to functionality category conversion component 320. As illustrated, tracking measures from one functionality category, such as functionality category 324a, may be transmitted to a corresponding functionality category 325a within functionality category conversion component 320.

In one example case, tracking measures may be stored on a device, such as within a database. The database may be arranged on a print device, such as print device 200, or a device external to the print device, such as server 216.

Functionality category conversion component 320 may operate in response to execution of instructions by a processor, such as processor 105 of FIG. 1. As illustrated, functionality category conversion component 320 may be capable of receiving, as input, tracking measures from functionality category tracking component 318. Functionality category conversion component 320 may also be capable of outputting modified tracking measures based on the tracking measures received from functionality category tracking component 318.

Functionality category conversion component 320 also illustrates visibility blocks 326a-326z. In one example, functionality category conversion component 320 may be capable of masking visibility of different functionality categories 325a-325z. FIG. 3 uses a diagonal fill pattern in visibility blocks 326c, 326d, and 326z to indicate example functionality categories (e.g., 325c, 325d, and 325z) for which visibility may be masked. As such, automated functionality tracking component 322 may not be aware of the existence of functionality categories having a masked visibility. Nevertheless, functionality category conversion component 320 may still be able to direct modified tracking measures to automated functionality tracking component 322.

Automated functionality tracking component 322 may operate in response to execution of instructions by a processor, such as processor 105 of FIG. 1, on a device of service provider 212 in FIG. 2 (although, this is without limitation; indeed, in one implementation, automated functionality tracking component 322 may operate at least in part on the local device, such as print device 200). Automated functionality tracking component 322 may comprise fewer functionality categories 327a-327z, represented as Cat1, Cat2, and CatN. Automated functionality tracking component 322 may receive signals indicative of modified tracking measures from functionality category conversion component 320, and may use the received modified tracking measures for tracking and billing, among other things. As noted, automated functionality tracking component 322 may enable both tracking and billing by a service provider, although that is not necessarily the case.

It is noted that the arrows leading from functionality category conversion component 320 to automated functionality tracking component 322 are not necessarily pointed in a same direction, nor are they necessarily of a same pattern fill. For example, arrow 328a has a square or hash fill indicating a modified tracking measure. Also, arrow 328a points towards functionality category 327a, potentially because the service provider may not support functionality category 324c or 325c. As noted above, because visibility of functionality category 325c may be masked (visibility block 326c), the service provider may be unaware of the existence of the functionality category on the device. Arrow 328b includes a horizontal line pattern fill, and arrow 328c includes a vertical line pattern fill, indicating transmission of modified tracking measures. Further, it is noted that both arrows 328b and 328c are directed towards functionality category 327b.

With an understanding of the form and function of the different block elements of FIG. 3, the potential disconnect between functionality categories offered by a device or application becomes apparent, as shown by the number of functionality categories 324a-324z, and the number of functionality categories 327a-327z supported by the service provider. As noted, there may be an interest in providing functionality to users that may not be supported by service providers, and functionality category conversion component 320 represents one form of an interface that may provide access to unsupported functionality categories.

In the following paragraphs, an example implementation of the functionality and tracking measure conversion shown in FIG. 3 will be discussed for a print device. Then, a subsequent example implementation will be discussed, again using FIG. 3, for a software application. This discussion will refer to the flow diagrams of FIGS. 4 and 5.

First, for the example of the print device illustrated in FIG. 2, a number of functionality categories 324a-324z (e.g., print modes) represented as Cat1-CatN may be offered. In this example, these functionality categories 324a-324z are print modes corresponding to a color print mode, a mono print mode (e.g., black and white), a general office print mode (e.g., a lower quality print mode, such as a draft print mode), an accent color print mode, a variable accent color print mode, a depletion color print mode, and a variable depletion color print mode, respectively. Print device 200 in FIG. 2 may track use of the different print modes, and may store and/or send signals indicative of tracking measures corresponding to the different print modes. As indicated by the arrows from functionality categories 324a-324z towards functionality categories 325a-325z, the signals indicative of tracking measures corresponding to different print modes may be transmitted to functionality category conversion component 320, which may be running on print device 200 (of FIG. 2), server 216, or a device on customer premise 206, a device of manufacturer 214, and/or a device of service provider 212. Functionality category conversion component 320 may determine whether a functionality category of functionality categories 325a-325z is supported by automated functionality tracking component 322, as illustrated by block 405 of method 400 in FIG. 4. For example, in response to execution of instructions by a processor, functionality category conversion component 320 may determine whether a first functionality category (e.g., functionality category 325a) is supported by automated functionality tracking component 322, as shown by blocks 405 and 410 of example method 400. If so, then functionality category conversion component 320 will determine whether other functionality categories (e.g., functionality categories 325b-325z) are supported by automated functionality tracking component 322. In one case, such a determination may be made by referring to a lookup table (LUT). In another case, a service, such as a remote service that may be running on a device of a manufacturer 214 or a service provider 212, may be queried to determine whether particular functionality categories are supported. If it is determined that there are no other categories (see block 415 in example method 400), then example method 400 can end. Otherwise, support for functionality categories may be determined for the other functionality categories.

Figure 4:
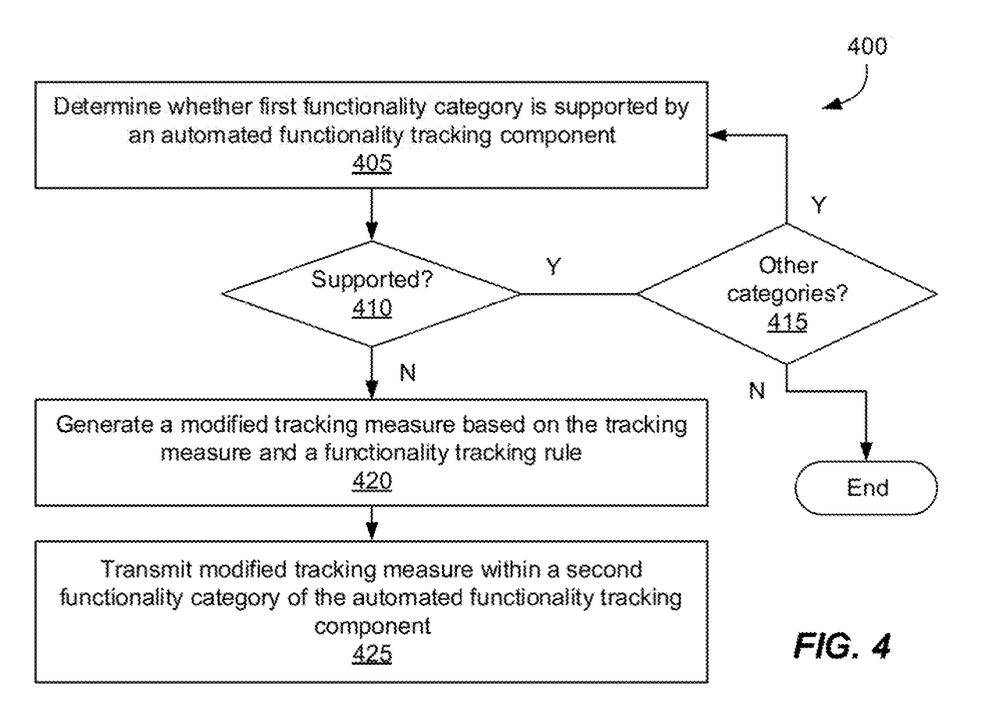
FIG. 4 is a flow diagram of an example method for generating modified tracking measures.

If, as illustrated by block 410, it is determined that a functionality category is not supported, such as may be the case for functionality categories 325c, 325d, and 325z in FIG. 3, then example method 400 may proceed to block 420 and a modified tracking measure may be generated based on the tracking measure received from functionality category tracking component 318. In one case, a functionality tracking rule may be used to determine how to generate the modified tracking measure. Tracking rules may correspond to handling instructions, such as may be received through a user interface of a device, instruction how to generate a modified tracking measure (e.g., how to scale, weight, etc.) and how to categorize the resulting modified tracking measure. As such, tracking rules may be indicative of a correspondence between a tracking measure, a first functionality category, and a second functionality category. Tracking rules may be stored on a machine-readable medium of a device, such as print device 200 or server 216, by way of non-limiting example. For instance, taking functionality category 325c by way of illustrative example, a functionality tracking rule may indicate that tracking measures corresponding to functionality category 325c (e.g., a general office print mode) are to be scaled to yield a modified tracking measure that is 0.8 times the value of the received tracking measure. Also, the functionality tracking rule may also indicate that modified tracking measure should be categorized in functionality category 327a, which may correspond to a color print mode in this example. Thus, if the tracking measure of device tracking category 325c is 1 k, the modified tracking measure may be 0.8*1 k, or 800. Similarly, functionality category conversion component 320 may generate modified tracking measures for functionality categories 325e and 325f. For example, the modified tracking measure corresponding to device category 325e may be generated by weighting the tracking measure. For instance, if the original tracking measure for functionality category 325e is 1 k also, then the modified tracking measure may be 1.2*1 k, or 1.2 k. And the modified tracking measure corresponding to functionality category 325f may be generated by using an equivalent measure (e.g., 1.0*1 k, assuming 1 k for the original tracking measure). Etc.

Then, as illustrated by block 425 in example method 400, the modified tracking measures may be transmitted, such as via a wired or wireless transceiver, to correspond to a second functionality category of the automated functionality tracking component (e.g., automated functionality tracking component 322 of FIG. 3). Arrows 328a, 328b, and 328c are illustrative of modified tracking measures being transmitted for categorization in different functionality categories. For instance, the example modified tracking measure (800 in the example, above) of arrow 328a may be transmitted for categorization within functionality category 327a (e.g., a color print mode, as noted above). The example modified tracking measure of 1.2 k of arrow 328b may be transmitted for categorization within functionality category 327b (e.g., a mono print mode). And the example modified tracking measure of 1 k of arrow 328c may also be transmitted for categorization within functionality category 327b. It is of note that in this example implementation, automated functionality tracking component 322 may be able to determine or identify functionality categories 325e and 325f, as illustrated by visibility blocks 3260 and 326f, while not being able to determine or identify functionality category 325c, as illustrated by visibility block 326c.

There may be an interest in adapting functionality category conversion component 320 in real-time. For example, there may be an interest in changing a conversion from an original tracking measure to a modified tracking measure (e.g., a weighting factor, a scaling factor, a functionality category correspondence, etc. may be altered). Additionally, as products are introduced with new functionality and/or functionality that is not otherwise supported by a service provider, there may be an interest in adapting functionality category conversion component 320 in order to enable use of unsupported functions of a device.

Figure 5:
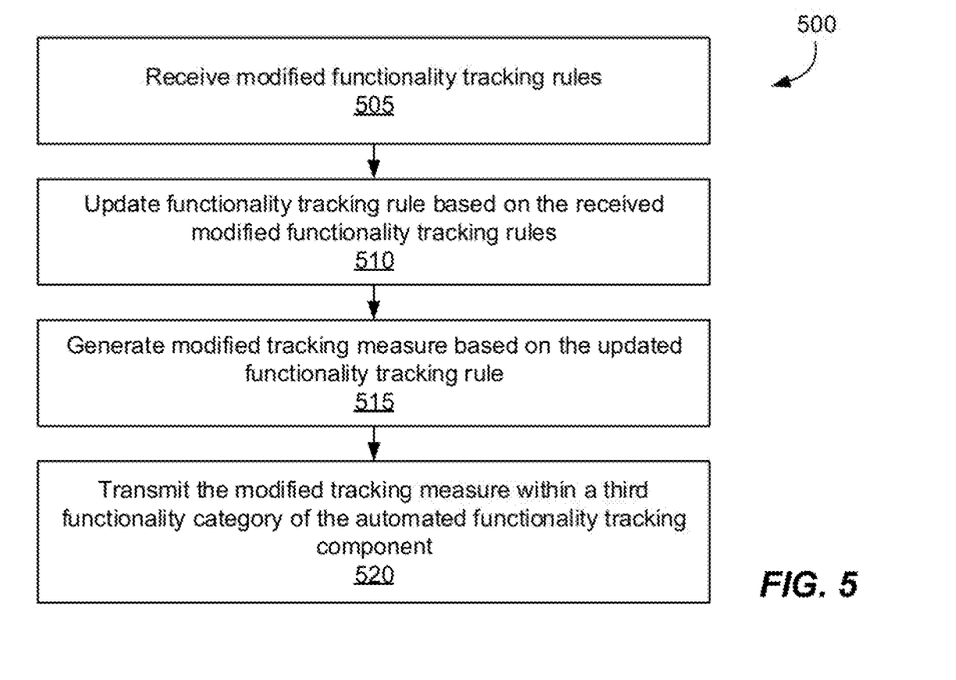
FIG. 5 is a flow diagram of an example method for updating functionality tracking rules.

FIG. 5 illustrates an example method 500 for altering an example functionality category conversion component, such as functionality category conversion component 320. At block 505, modified functionality tracking rules may be received. The rules may alter a weighting factor, a scaling factor, a functionality category correspondence, a visibility of a functionality category, and the like. At block 510, an existing functionality tracking rule of functionality category conversion component 320 may be updated and/or altered based on the received modified functionality tracking rules. Thus, when performing block 515 and 520, in which a modified tracking measure is generated based on the updated functionality rule, and the modified tracking measure is transmitted within a third functionality category of automated functionality tracking component 322, the outcome may be different than that of blocks 420 and 425, described above in relation to FIG. 4. For instance, rather than a modified tracking measure corresponding to arrow 328c having a weighting or scaling factor of 1.0 and being categorized in functionality category 327b, a scaling factor of 0.3 may be used and the resulting modified tracking measure may be categorized in functionality category 327a. It is noted that in addition to being of interest to manufacturers and customers, the foregoing may also be of interest to service providers, such as to allow promotions (e.g., offering one functionality for a reduced price) without necessarily changing the tracking and billing system.

A brief example involving a machine-executed application provided by a service provider (e.g., similar to service provider 212 in FIG. 2) is now presented in relation to FIG. 3. In this example, the service provider offers premise security solutions to residential and business customers. The service provider may provide security equipment (e.g., sensors, thermostats, cameras, locks, etc.) along with a machine-executed application to allow customers to monitor, manage, and control the provided security equipment. The software may be provided by a manufacturer (e.g., similar to manufacturer 214 in FIG. 2). In this example, the machine-executed application may offer functionality not supported by the service provider. Thus, a functionality category conversion component 320 may be used in order to generate modified tracking measures to be submitted to automated functionality tracking component 322, similar to as was discussed above.

In yet another brief example, a combination of hardware and software may be provided by a service provider (e.g., similar to service provider 212 in FIG. 2). In this example, the service provider may offer hardware and software to enable formation of three-dimensional (3D) objects, such as through application of marking and binding agents to a build material. In this example, the print device capable of forming 3D objects may apply layers of build material in a bed, agents (e.g., marking agents to provide color to the build material, and binding agents to cause the build material to bind) may be applied to successive layers of build material. In one case, the build material and agents may be exposed to electromagnetic radiation, such as in the UV spectrum of light. The formation of 3D objects using the print device may be enabled by software running on computing devices. In this example, functionality of the print device (e.g., certain build materials, marking agents, and/or binding agents, by way of example) and/or functionality of the software (e.g., enabling application of marking agents, enabling binding agents of a certain type, etc.) may not be supported by the service provider. An interface, such as functionality category conversion component 320 may be used in order to generate modified tracking measures to be submitted to a tracking and billing system (e.g., automated functionality tracking component 322), which may thereby allow customers to use functionality of the print device and/or the software that is not supported by the service provider.

It should be understood that the foregoing are merely offered by way of example and should not be taken in a limiting sense. Indeed, a number of possible implementations are contemplated by claimed subject matter for providing modified tracking measures and categorizing the resultant modified tracking measures in supported functionality categories.

What is claimed is:

1. A non-transitory machine-readable medium comprising instructions stored thereon that when executed by a processor are to cause the processor to:
   receive signals indicative of a tracking measure for a first functionality category;
   determine whether the first functionality category is supported by an automated functionality tracking component;
   in response to a determination that the first functionality category is unsupported by the automated functionality tracking component, generate a modified tracking measure based on the tracking measure, wherein the modified tracking measure is further based on a functionality tracking rule;
   transmit signals indicative of the modified tracking measure for categorization in a second functionality category, wherein the second functionality category is different from the first functionality category
   receive signals indicative of a modified functionality tracking rule;
   update the functionality tracking rule based on the signals indicative of the modified functionality tracking rule; and
   transmit signals indicative of the modified tracking measure for categorization in a third functionality category based on the updated functionality tracking rule, and wherein the third functionality category is different from the first and the second functionality categories.

2. The non-transitory machine-readable medium of claim 1, wherein to generate the modified tracking measure is to comprise application of a weighting factor to the tracking measure.

3. The non-transitory machine-readable medium of claim 1, wherein the automated functionality tracking component is remote with respect to the non-transitory machine-readable medium.

4. The non-transitory machine-readable medium of claim 1, wherein the tracking measure comprises a page print count and the first functionality category comprises a depletion color print mode.

5. The non-transitory machine-readable medium of claim 1, wherein the first functionality category is masked to the automated functionality tracking component.

6. The non-transitory machine-readable medium of claim 1, wherein the signals indicative of the modified tracking measure are to be transmitted via a network.

7. A method comprising:
for a tracking measure for a first functionality category, determining whether the first functionality category is supported by an automated functionality tracking component;
generating a modified tracking measure based on the tracking measure and a functionality tracking rule in response to determining that the first functionality category is not supported by the automated functionality tracking component, wherein the modified tracking measure is based on a functionality tracking rule;
transmitting the modified tracking measure within a second functionality category of the automated functionality tracking component while masking visibility of the first functionality category for the automated functionality tracking component;
receiving modified functionality tracking rules;
updating the functionality tracking rule based on the received modified functionality tracking rules;
generating the modified tracking measure based on the updated functionality tracking rule; and
transmitting the modified tracking measure within a third functionality category of the automated functionality tracking component based on the updated functionality tracking rule, wherein the third functionality category is different from the second functionality category.

8. The method of claim 7, wherein generating the modified tracking measure comprises scaling the tracking measure based on a scaling factor corresponding to a transformation to enable categorization within the second functionality category.

9. The method of claim 7 further comprising:
storing the tracking measure and the first functionality category; and
transmitting the tracking measure and the first functionality category to a remote device.

10. The method of claim 7, wherein the functionality tracking rule is indicative of a correspondence between the tracking measure, the first functionality category, and the second functionality category.

11. A system comprising:
a device comprising a functionality category tracking component to provide tracking measures for a plurality of functionality categories supported by the device;
a functionality category conversion component to:
generate modified tracking measures corresponding to a second functionality category, wherein the modified tracking measures are to be based on a first tracking measure for a first functionality category from the functionality category tracking component and a first functionality tracking rule,
receive a modified functionality tracking rule, and
generate modified tracking measures corresponding to a third functionality category based on the modified functionality tracking rule; an automated functionality tracking component to:
receive the modified tracking measures corresponding to the second functionality category, wherein the automated functionality tracking component lacks support of the first functionality category, and
receive the modified tracking measures corresponding to the third functionality category wherein the third functionality category is different from the first and the second functionality categories; and
a device manufacturer tracking component to receive the first tracking measure for the first functionality category.

12. The system of claim 11, wherein the device comprises a print device and the automated functionality tracking component resides on a server of a service provider connected to the print device via a network.

13. The system of claim 12, wherein the functionality category conversion component resides on a remote server arranged between the print device and the server of the service provider.

* * * * *